(12) United States Patent
Huang et al.

(10) Patent No.: US 10,173,411 B2
(45) Date of Patent: Jan. 8, 2019

(54) THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Chen-Fu Huang, New Taipei (TW); An-Hsiu Lee, New Taipei (TW); Hao-Jen Huang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 511 days.

(21) Appl. No.: 14/564,052

(22) Filed: Dec. 8, 2014

(65) Prior Publication Data

US 2016/0089839 A1 Mar. 31, 2016

(30) Foreign Application Priority Data

Sep. 29, 2014 (TW) .............................. 103217260 U

(51) Int. Cl.
*B29C 67/00* (2017.01)
*B33Y 40/00* (2015.01)
*B29C 64/135* (2017.01)
*B29L 9/00* (2006.01)

(52) U.S. Cl.
CPC ............ *B33Y 40/00* (2014.12); *B29C 64/135* (2017.08); *B29L 2009/00* (2013.01)

(58) Field of Classification Search
CPC ..... B29C 67/00; B29C 67/0051; B29C 64/00; B29C 64/106; B29C 64/20; B29C 64/393; B33Y 40/00; B33Y 50/02
USPC ............................... 264/308; 425/135, 174.4
See application file for complete search history.

(56) References Cited

U.S. PATENT DOCUMENTS

| | | | | |
|---|---|---|---|---|
| 7,621,733 B2* | 11/2009 | Reynolds | ............ | B29C 67/0066 425/174.4 |
| 8,221,671 B2* | 7/2012 | Hull | .................... | B29C 67/0055 264/113 |
| 2009/0262150 A1* | 10/2009 | Morita | ................. | B41J 2/17596 347/6 |

* cited by examiner

*Primary Examiner* — Joseph S Del Sole
*Assistant Examiner* — Thu Khanh T Nguyen
(74) *Attorney, Agent, or Firm* — JCIPRNET

(57) ABSTRACT

A 3-D printing apparatus includes a frame, a tank, an automatic-filling module and a control unit. The tank is disposed in the frame and contains a liquid-forming material. The automatic-filling module includes a sensing unit, a reservoir, a filling pipe and a pressuring unit. The sensing unit detects a liquid level of the tank. The reservoir stores the liquid-forming material. The filling pipe connects to the reservoir and includes an outlet. A maximum liquid level of the liquid-forming material in the reservoir is lower than or equal to a level of the outlet. A gap exists between the outlet and a top edge of the tank. The pressuring unit provides a positive pressure to the reservoir so that the liquid-forming material in the reservoir flows to the tank. The control unit determines whether the pressuring unit provides the positive pressure to the reservoir according to the liquid level.

9 Claims, 1 Drawing Sheet

THREE-DIMENSIONAL PRINTING APPARATUS

CROSS-REFERENCE TO RELATED APPLICATION

This application claims the priority benefit of Taiwan application serial no. 103217260, filed on Sep. 29, 2014. The entirety of the above-mentioned patent application is hereby incorporated by reference herein and made a part of this specification.

BACKGROUND OF THE DISCLOSURE

Field of the Invention

The present disclosure is related to a three-dimensional printing apparatus, and more particularly to a Stereolithography (SL) three-dimensional printing apparatus.

Description of Related Art

In recent years, with the increasing development of technology, various methods for building three-dimensional (3D) models with the use of additive manufacturing technology such as a layer-by-layer structuring model are provided one after another. In general, the additive manufacturing technology transforms design information of the 3D models structured by softwares such as computer-aided design (CAD) into a plurality of thin (quasi-two-dimensional) cross-section layers that are stacked continuously. Meanwhile, many technical means capable of forming a plurality of thin cross-section layers are gradually provided. For instance, a printing module of a printing apparatus usually moves above a base along an XY plane according to space coordinates XYZ structured by the design information of the 3D model, so that structuring materials are formed into correct shapes of the cross-section layers. Deposited structuring materials subsequently harden naturally or are solidified through heating or irradiation by a light source, and thereby a desired cross-section layer is formed. Therefore, by means of the movement of the printing module along an axis Z layer by layer, the plurality of cross-section layers are gradually stacked along a Z-axis, so that the structuring material forms the 3D object in a status of solidification layer by layer.

Take the Stereolithography (SL) 3D printing apparatus that forms the 3D object by solidifying the structuring materials through the light source, the printing module is adapted for immersion in a liquid-forming material contained in a tank, and a light source module irradiates the liquid-forming material serving as the structuring material on the XY plane, so that the liquid-forming material is solidified and stacked on a movable platform of the printing module. Thereby, by means of the movement of the movable platform of the printing module along the axis Z layer by layer, the liquid-forming material is solidified layer by layer and stacked to form the 3D object. However, the process that the 3D object is formed by layer-by-layer stacking keeps consuming the liquid-forming material in the tank, and currently it still requires constant attention by operating staff alongside to keep an eye on the remaining amount of the liquid-forming material in the tank and manually replenish the tank with the liquid-forming material from time to time. Therefore, operation of the current SL 3D printing apparatus is still very much inconvenient. Furthermore, if the liquid-forming material of the SL 3D printing apparatus is exhausted during the printing process due to momentary oversight by the operating staff, printing fails. In addition, since it is relatively difficult to control the amount of replenishment, when the operating staff replenishes the tank with the liquid-forming material, it often occurs that the liquid-forming material spills over due to excessive replenishment, which thereby causes damages to the apparatus. Therefore, it gradually becomes the focus of attention by developers in the art to effectively reduce the operating and maintenance costs of the 3D printing apparatus.

SUMMARY OF THE INVENTION

The present disclosure is directed to a 3D printing apparatus capable of automatically replenishing a tank with a liquid-forming material.

According to an embodiment of the present disclosure, the 3D printing apparatus forms a 3D object by curing a liquid-forming material layer by layer, and the 3D printing apparatus includes a frame, a tank, an automatic-filling module and a control unit. The tank is disposed in the frame and contains the liquid-forming material. The automatic-filling module includes a sensing unit, a reservoir, a filling pipe and a pressuring unit. The sensing unit is configured to detect a liquid level of the tank. The reservoir is disposed in the frame for storing the liquid-forming material. The filling pipe connects the reservoir and includes an outlet, so that the liquid-forming material in the reservoir is injected to the tank via the outlet. A maximum liquid level of the liquid-forming material in the reservoir is substantially lower than or equal to a level of the outlet. A gap exists between the outlet and a top edge of the tank. The pressuring unit is configured to provide a positive pressure to the reservoir, so that the liquid-forming material in the reservoir is injected to the tank. The control unit is coupled to the automatic-filling module to determine whether the pressuring unit provides the positive pressure to the reservoir according to the liquid level detected by the sensing unit.

According to an embodiment of the present disclosure, the sensing unit includes a detector and a buoy. The buoy is arranged in the tank and floats on the liquid-forming material. The detector detects the liquid level according to the position of the buoy.

According to an embodiment of the present disclosure, the gap is substantially 5 mm.

According to an embodiment of the present disclosure, the pressuring unit includes an air pump.

According to an embodiment of the present disclosure, the control unit turns on the pressuring unit to provide the positive pressure to the reservoir when the liquid level is lower than a first liquid level. The control unit turns off the pressuring unit to stop providing the positive pressure to the reservoir when the liquid level reaches a second liquid level, wherein the second liquid level is higher than the first liquid level.

According to an embodiment of the present disclosure, the automatic-filling module further includes a decompression unit. The control unit turns off the decompression unit when the control unit turns on the pressurizing unit to provide the positive pressure to the reservoir. The control unit turns on the decompression unit to release the positive pressure in the reservoir when the control unit turns off the pressurizing unit.

According to an embodiment of the present disclosure, the decompression unit includes an air escape valve.

According to an embodiment of the present disclosure, the 3D printing apparatus further includes a lifting platform and a light source. The lifting platform is movably disposed above the tank. The light source is disposed on one side of the tank for irradiating and curing the liquid-forming material. The control unit is coupled to the light source and the lifting platform so as to control the lifting platform to move in the liquid-forming material in the tank and to control the light source to irradiate the liquid-forming material, so that the irradiated liquid-forming material is cured layer by layer, and the 3D object is formed on the lifting platform.

According to an embodiment of the present disclosure, the lifting platform moves in a direction away from the light source layer by layer in the tank.

According to an embodiment of the present disclosure, the liquid-forming material includes a photosensitive resin.

Based on the above, the 3D printing apparatus of the present disclosure determines whether the pressuring unit provides the positive pressure to the reservoir according to the liquid level of the liquid-forming material in the tank detected by the sensing unit so that the liquid-forming material in the reservoir is injected to the tank via the outlet of the filling pipe, so as to fulfill the purpose of automatic replenishment with the liquid-forming material. Furthermore, since the reservoir of the present disclosure is embedded in the frame, in addition to improving the aesthetics of the 3D printing apparatus, this arrangement is further able to reduce the maximum liquid level in the reservoir, so that the maximum liquid level of the liquid-forming material in the reservoir is lower than or equal to the level of the outlet. Thereby, under the circumstance that the tank does not need the filling of the liquid-forming material, the problem could be avoided that the liquid-forming material still flows from the reservoir to the tank due to siphon phenomenon if the liquid level of the liquid-forming material in the reservoir is higher than the outlet of the filling pipe. Therefore, the 3D printing apparatus of the present disclosure indeed enhances convenience in its use and is further able to reduce its operating and maintenance costs effectively.

In order to make the aforementioned and other features and advantages of the present disclosure more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

In the following detailed description of preferred embodiment, reference is made to the accompanying drawings which form a part hereof, and in which are shown by way of illustration specific embodiment in which the present disclosure may be practiced. In this regard, directional terminology, such as "top," "bottom," "front," "back," "left," "right," etc., is used with reference to the orientation of the Figure(s) being described. As such, the directional terminology is used for purposes of illustration and is in no way limiting. Furthermore, in the following embodiment, the same or similar components adopt the same or similar numerals.

Figure 1:
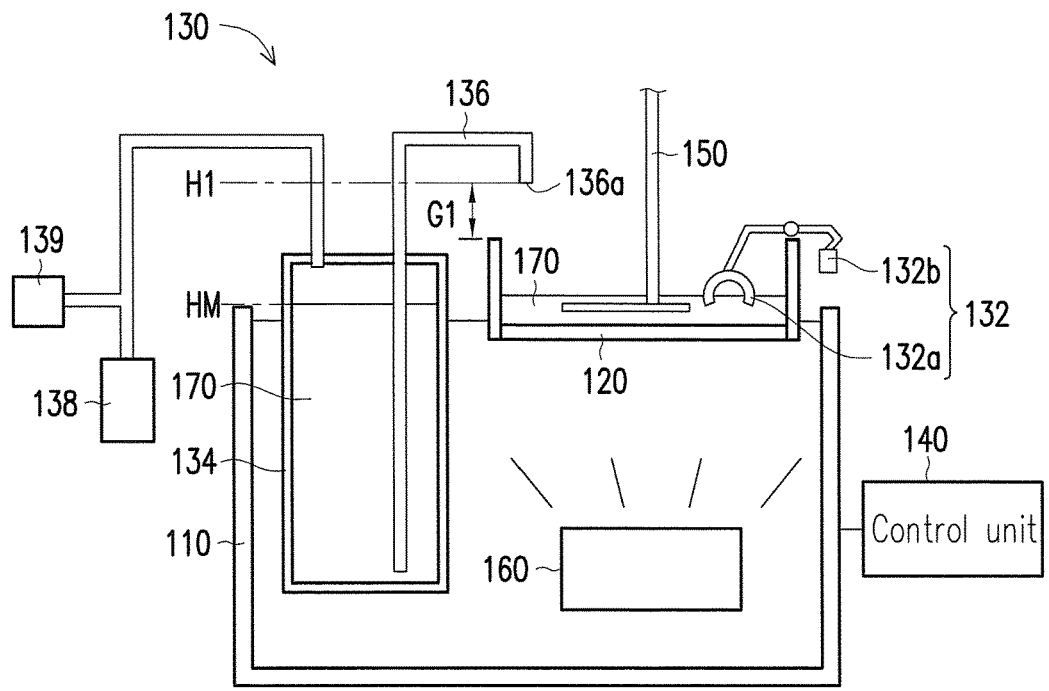
FIG. 1 is a schematic cross-section view of a 3D printing apparatus according to an exemplary embodiment.
Figure 2:
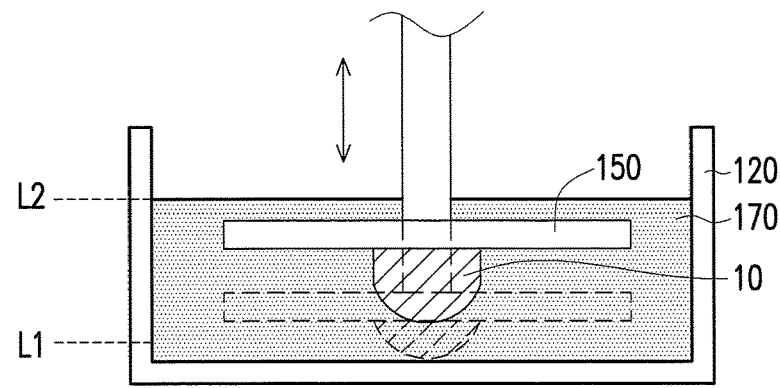
FIG. 2 is a schematic printing view of the 3D printing apparatus according to the exemplary embodiment.
Figure 2:
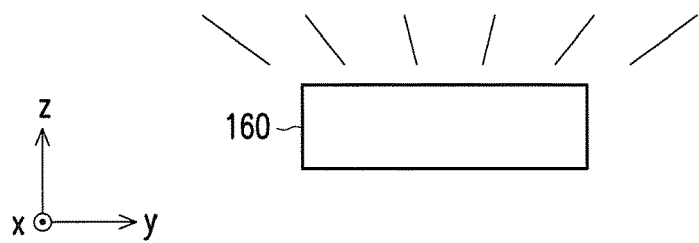

FIG. 1 is a schematic cross-section view of a 3D printing apparatus according to an exemplary embodiment. FIG. 2 is a schematic printing view of the 3D printing apparatus according to the exemplary embodiment. Referring to both FIGS. 1 and 2, in this embodiment, a 3D printing apparatus 100 forms a 3D object by curing a liquid-forming material layer by layer, and the 3D printing apparatus 100 includes a frame 110, a tank 120, an automatic-filling module 130, a control unit 140, a lifting platform 150 and a light source 160. In this embodiment, the control unit 140 may, for example, read a digital 3D model and is coupled to the automatic-filling module 130, the lifting platform 150 and the light source 160, so as to control the actuation of the automatic-filling module 130, the lifting platform 150 and the light source 160 according to the digital 3D model. In this embodiment, the digital 3D model may be a digital 3D image file which is built by a computer host via computer-aided design (CAD) or an animation modeling software.

More specifically, the tank 120 is disposed in the frame 110 and contains a liquid-forming material 170, and the lifting platform 150 is movably arranged above the tank 120 is configured for moving toward a direction closer to the tank 120, so as to be immersed in the liquid-forming material 170. The light source 160 is arranged on one side of the tank 120. In this embodiment, the light source 160, as shown in FIG. 1, is arranged under the tank 120 for irradiating and curing a specific portion of the liquid-forming material 170. The 3D printing apparatus 100 is adapted for reading the digital 3D model and cross-cutting the digital 3D model into a plurality of cross sections. The control unit 140 forms a 3D object 10 layer by layer according to the cross sections of the digital 3D model, and this 3D object 10 is obtained by irradiating and curing the liquid-forming material 170 by the light source 160.

More particularly, in this embodiment, the lifting platform 150 is disposed above the tank 120 and is adapted for moving relative to the tank 120 along an axis, and this axis is, for example, perpendicular to a liquid level of the liquid-forming material 170. For instance, as shown in FIG. 2, the lifting platform 150 is configured for moving along an axis Z to be immersed in the liquid-forming material 170 in the tank 120. In this embodiment, the lifting platform 150 has a carrying surface for carrying the 3D object 10, and the carrying surface faces the light source 160. The light source 160 is disposed, for example, under the tank 120, and the light source 160 may include a laser element and/or a oscillating mirror module. The laser element is configured for emitting a laser beam, and the oscillating mirror module is configured for reflecting the laser beam to the liquid-forming material 170. However, the present disclosure does not limit on the types and components of the light source 160. In this embodiment, the liquid-forming material 170 is, for example, a photosensitive resin or other suitable photo-curing materials. Therefore, the liquid-forming material 170 is cured after being irradiated by the light source 160. Thereby, the control unit 140 controls the lifting platform 150 to be immersed in the liquid-forming material 170 in the tank 120 to an initial depth and controls the lifting platform 150 to move, as shown in FIG. 2, from the initial depth in the liquid-forming material 170 toward a direction away from the light source 160 layer by layer. The light source 160 is controlled to irradiate a specific portion of the liquid-forming material 170 on a carrying surface of the lifting platform 150 layer by layer, so as to cure the irradiated specific portion of the liquid-forming material 170 layer by layer, and to form the 3D object 10 via layer-by-layer stacking the cured liquid-forming material 170 on the carrying surface of the lifting platform 150.

In this embodiment, the automatic-filling module 130, as shown in FIG. 1, includes a sensing unit 132, a reservoir 134, a filling pipe 136 and a pressuring unit 138. The sensing unit 132 is disposed, for example, on the tank 120 and is configured to detect a liquid level of the tank 120. For instance, the sensing unit 132 may include a buoy 132a and a detector 132b. The buoy 132a is disposed in the tank 120 and floats on the liquid-forming material 170. The detector 132b detects the liquid level in the tank 120 according to the position of the buoy 132a. Of course, this embodiment is merely for illustration, and the present disclosure does not limit on the types and components of the sensing unit 132.

Furthermore, the filling pipe 136 connects to the reservoir 134 and includes an outlet 136a. The control unit 140 is coupled to the automatic-filling module 130 to determine whether the pressuring unit 138 provides a positive pressure to the reservoir 134 according to the liquid level in the tank 120 detected by the sensing unit 132, so that the liquid-forming material 170 in the reservoir 134 is injected to the tank 120 through the outlet 136a of the filling pipe 136. More particularly, when the sensing unit 132 detects that the liquid level in the tank 120 is lower than a first liquid level L1 as shown in FIG. 2, the control unit 140 turns on the pressuring unit 138 so as to provide the positive pressure to the reservoir 134, so that the liquid-forming material 170 in the reservoir 134 is injected to the tank 120. Thereby, the liquid-forming material 170 in the reservoir 134 keeps injecting to the tank 120. When the liquid level in the tank 120 reaches a second liquid level L2 higher than the first liquid level L1 as shown in FIG. 2, the control unit 140 turns off the pressuring unit 138 to stop providing the positive pressure to the reservoir 134, so that the liquid-forming material 170 stops injecting to the tank 120.

In this embodiment, the reservoir 134 is disposed in the frame 110 and stores the liquid-forming material 170. A maximum liquid level HM of the liquid-forming material 170 in the reservoir 134 is substantially lower than or equal to a level H1 of the outlet 136a. With such an arrangement that embeds the reservoir 134 in the frame 110, not only the aesthetics of the 3D printing apparatus 100 is improved, but the maximum liquid level HM in the reservoir 134 is also reduced. Thereby, since the liquid level of the liquid-forming material 170 in the reservoir 134 is higher than the outlet 136a of the filling pipe 136, under the circumstance that the tank 120 does not need the filling of the liquid-forming material 170, it could be avoided that the liquid-forming material 170 still flows from the reservoir 134 to the tank 120 due to siphon phenomenon. In addition, since a gap G1 exists between the outlet 136a and a top edge of the tank 120, the tank 120 may be easily mounted or dismounted without structural interference or even clash with the outlet 136a during the process of mounting or dismounting, while ensuring that the liquid-forming material 170 does not splash out of the tank 120 during the injection due to the height of the outlet 136a. In this embodiment, the gap G1 is designed to be, for example, 5 mm, which height may vary in correspondence with the size of the tank 120.

More specifically, the automatic-filling module 130 may further include a decompression unit 139. In this embodiment, the pressuring unit 138 may be, for example, an air pump for introducing gas into the reservoir 134 to provide the positive pressure, while the decompression unit 139 may be, for example, an air escape valve for discharging excessive gas so as to balance the pressure in the reservoir 134. The pressuring unit 138 and the decompression unit 139 may, for example, be coupled to the control unit 140 in parallel connection. Thereby, when the control unit 140 turns on the pressuring unit 138 to provide the positive pressure to the reservoir 134, the control unit 140 turns off the decompression unit 139 to maintain the positive pressure in the reservoir 134, so as to inject the liquid-forming material 170 into the tank 120. When the control unit 140 turns off the pressuring unit 138, the control unit 140 turns on the decompression unit 139 to release the positive pressure in the reservoir 134, so that the liquid-forming material 170 stops injecting to the tank 120.

In view of the above, the 3D printing apparatus of the present embodiment determines whether the pressuring unit provides the positive pressure to the reservoir according to the liquid level of the liquid-forming material in the tank detected by the sensing unit so that the liquid-forming material in the reservoir is injected to the tank via the outlet of the filling pipe, so as to fulfill the purpose of automatic replenishment with the liquid-forming material. Furthermore, since the reservoir of the present embodiment is embedded in the frame, in addition to improving the overall visual impression of the 3D printing apparatus, this arrangement is further able to reduce the maximum liquid level in the reservoir, so that the maximum liquid level of the liquid-forming material in the reservoir is lower than or equal to the level of the outlet. Thereby, since the liquid level of the liquid-forming material in the reservoir is higher than the outlet of the filling pipe, under the circumstance that the tank does not need the filling of the liquid-forming material, the problem could be avoided that the liquid-forming material still flows from the reservoir to the tank due to siphon phenomenon.

In addition, since the gap exists between the outlet and the top edge of the tank, the tank may be easily mounted or dismounted without interference or even clash with the outlet during the process of mounting or dismounting. In addition, the automatic-filling module may further include a decompression unit for discharging excessive gas, so as to balance the pressure in the reservoir under the circumstance that the tank does not need the filling of the liquid-forming material, so that the liquid-forming material stops flowing to the tank. Therefore, the 3D printing apparatus of the present disclosure indeed enhances the convenience in its use and is further able to reduce its operating and maintenance costs effectively.

Although the present disclosure has been described with reference to the embodiments thereof, it will be apparent to one of the ordinary skills in the art that variations and modifications to the described embodiments may be made without departing from the spirit and scope of the present disclosure. Accordingly, the scope of the present disclosure will be defined by the attached claims, not by the above detailed description.

What is claimed is:

1. A three-dimensional (3D) printing apparatus for forming a 3D object by curing a liquid-forming material layer by layer, the 3D printing apparatus comprising:
   a frame;
   a tank, disposed in the frame and containing the liquid-forming material;
   an automatic-filling module, comprising:
   a sensing unit, comprising a linking bar, a detector and a buoy, wherein the linking bar is connected between the buoy and the detector and pivotally connected to the tank, the buoy floats on the liquid-forming material, and the detector detects a liquid level of the tank according to the position of the buoy;
   a reservoir, disposed in the frame for storing the liquid-forming material;

a filling pipe, connecting the reservoir and comprising an outlet located above the tank, and a gap exists between the outlet and a top edge of the tank;

a pressuring unit, configured to provide a positive pressure to the reservoir, so that the liquid-forming material in the reservoir is injected to the tank;

a control unit, coupled to the automatic-filling module to determine whether the pressuring unit provides the positive pressure to the reservoir for the liquid-forming material in the reservoir to be injected to the tank according to the liquid level detected by the sensing unit; and a decompression unit, comprising an air escape valve for discharging excessive gas from the reservoir so as to balance the pressure in the reservoir, the control unit turns off the decompression unit when the control unit turns on the pressuring unit to provide the positive pressure to the reservoir, and the control unit turns on the decompression unit when the control unit turns off the pressuring unit to release the positive pressure in the reservoir.

2. The 3D printing system as recited in claim 1, wherein the gap is 5 mm.

3. The 3D printing system as recited in claim 1, wherein the pressuring unit comprises an air pump.

4. The 3D printing system as recited in claim 1, wherein the control unit turns on the pressuring unit to provide the positive pressure to the reservoir when the liquid level is lower than a first liquid level, and the control unit turns off the pressuring unit to stop providing the positive pressure to the reservoir when the liquid level reaches a second liquid level, wherein the second liquid level is higher than the first liquid level.

5. The 3D printing system as recited in claim 1, wherein the decompression unit comprises an air escape valve.

6. The 3D printing system as recited in claim 1, further comprising:

a lifting platform, movably arranged above the tank; and a light source, disposed on one side of the tank for irradiating and curing the liquid-forming material, wherein the control unit is coupled to the light source and the lifting platform so as to control the lifting platform to move in the liquid-forming material in the tank and to control the light source to irradiate the liquid-forming material, so that the irradiated liquid-forming material is cured layer by layer, and the 3D object is formed on the lifting platform.

7. The 3D printing system as recited in claim 6, wherein the lifting platform moves in a direction away from the light source layer by layer in the tank.

8. The 3D printing system as recited in claim 1, wherein the liquid-forming material comprises a photosensitive resin.

9. The 3D printing system as recited in claim 1, wherein a maximum liquid level of the liquid-forming material in the reservoir is lower than or equal to a level of the outlet.

* * * * *